(No Model.) 13 Sheets—Sheet 1.
C. W. THOMAS.
ELECTRIC RAILWAY.
No. 462,177. Patented Oct. 27, 1891.
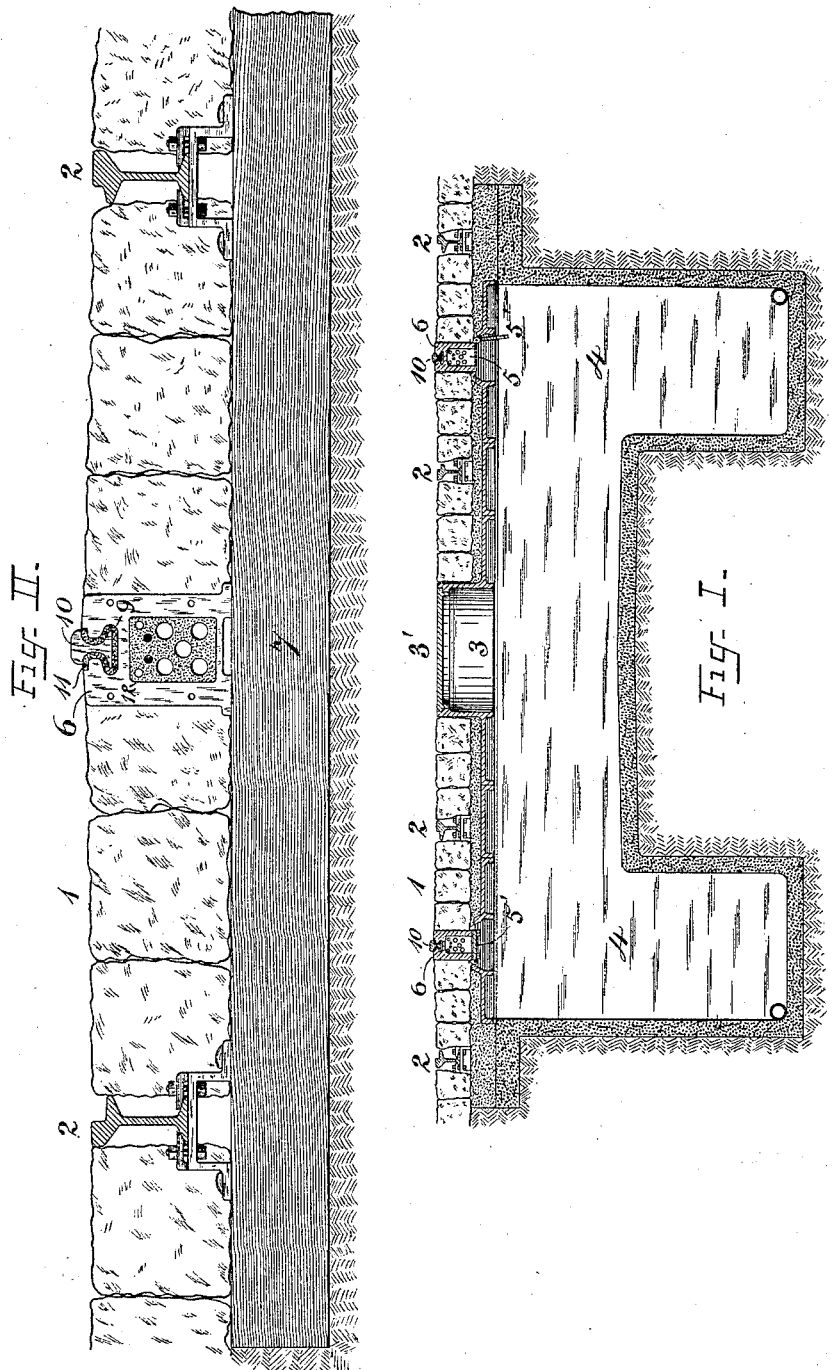
Witnesses
Frank Guile
Mazie V. Bidgood
Inventor
C. W. Thomas
By
Attorneys (No Model.) 13 Sheets—Sheet 2.
C. W. THOMAS.
ELECTRIC RAILWAY.
No. 462,177. Patented Oct. 27, 1891.
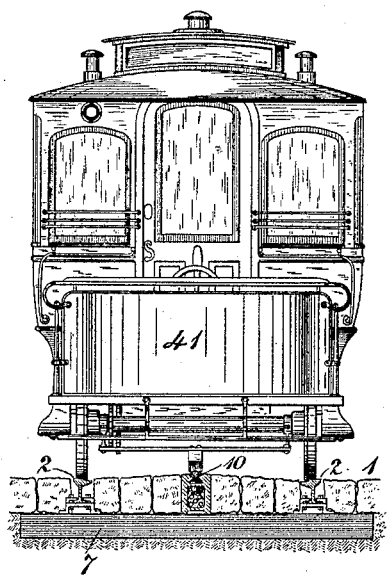
Fig. IV.
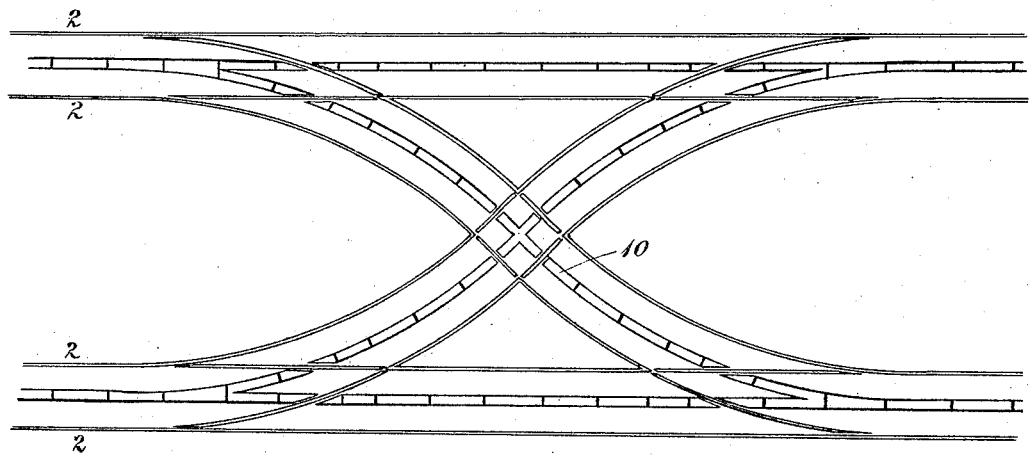
Fig. III.
Witnesses
Frank Guile
Mazie V. Bidgood
Inventor
C. W. Thomas
By [signature]
Attorneys

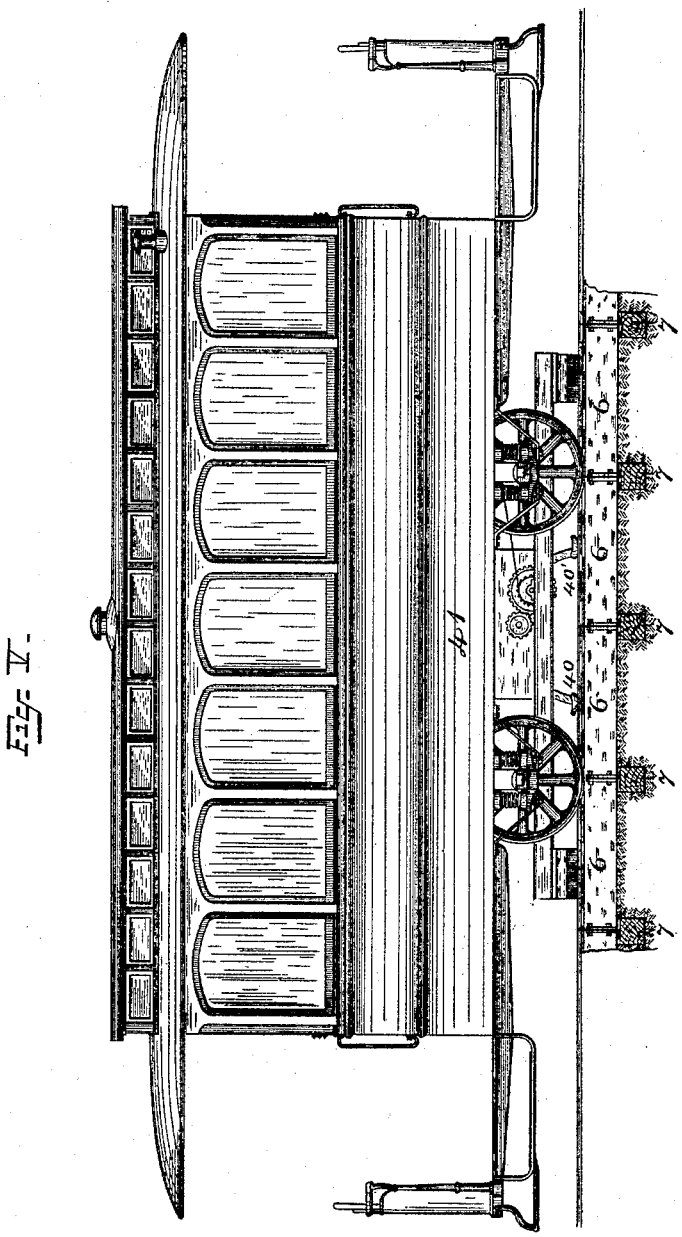

(No Model.)  
13 Sheets—Sheet 4.
C. W. THOMAS.
ELECTRIC RAILWAY.
No. 462,177. Patented Oct. 27, 1891.
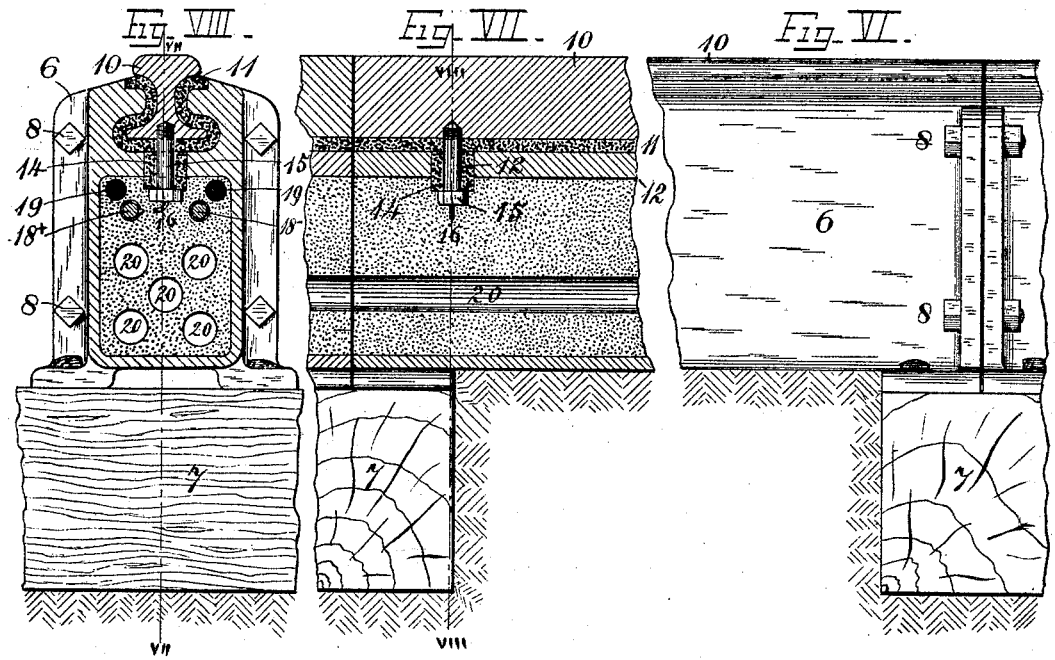
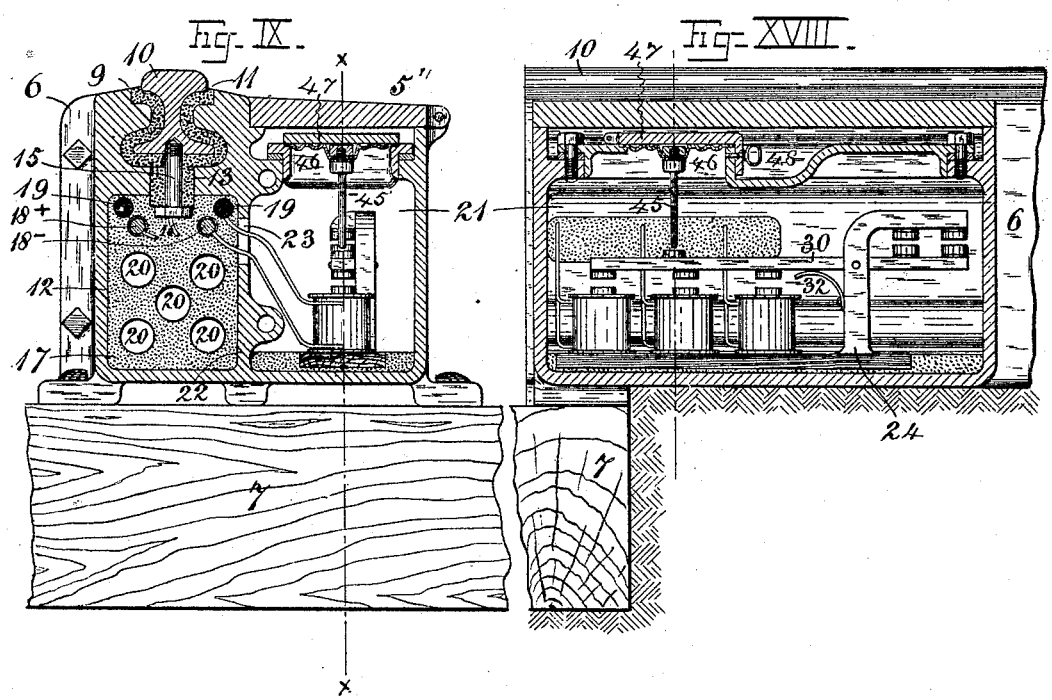

(No Model.)
13 Sheets—Sheet 5.
C. W. THOMAS.
ELECTRIC RAILWAY.
No. 462,177. Patented Oct. 27, 1891.
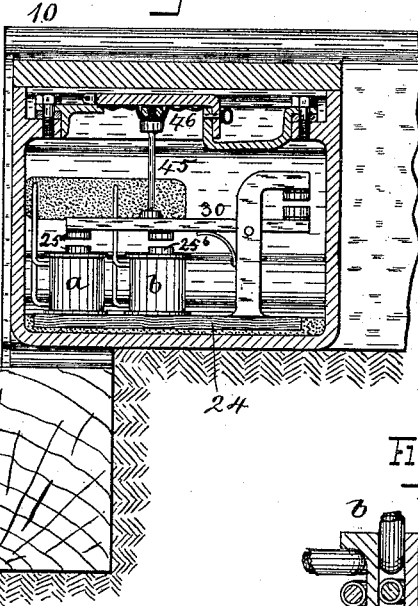
Fig. X.
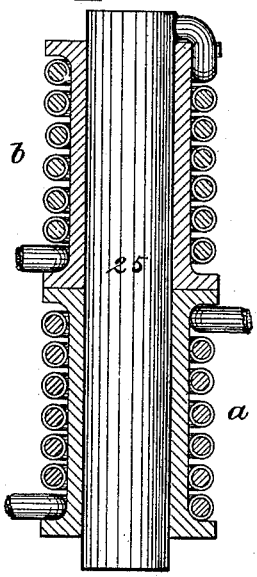
Fig. XXIX.
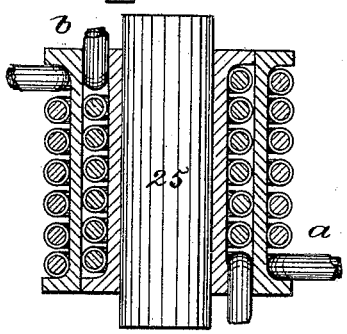
Fig. XXX.
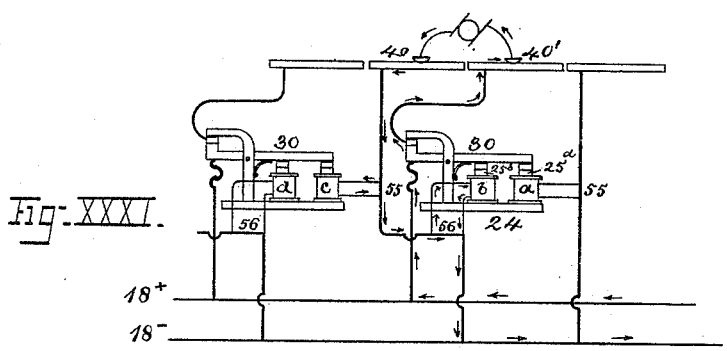
Fig. XXXI.
Witnesses
Frank Guile
Mazie V. Bidgood
Inventor
C. W. Thomas
By
Attorneys (No Model.) 13 Sheets—Sheet 6.
C. W. THOMAS.
ELECTRIC RAILWAY.
No. 462,177. Patented Oct. 27, 1891.
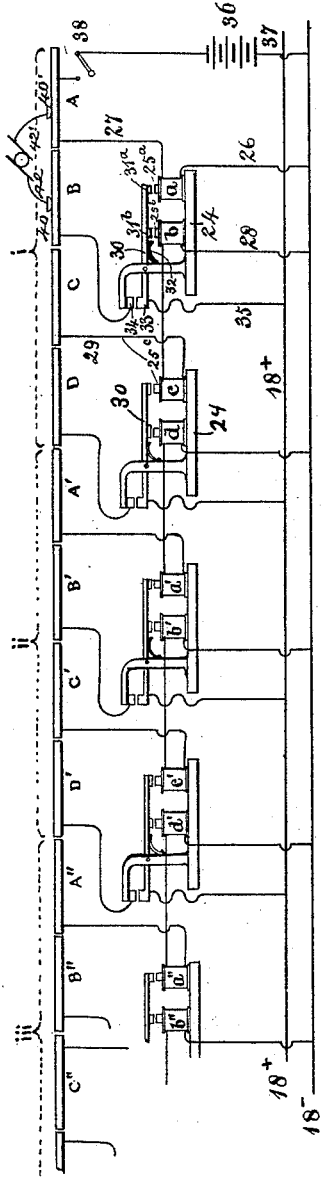
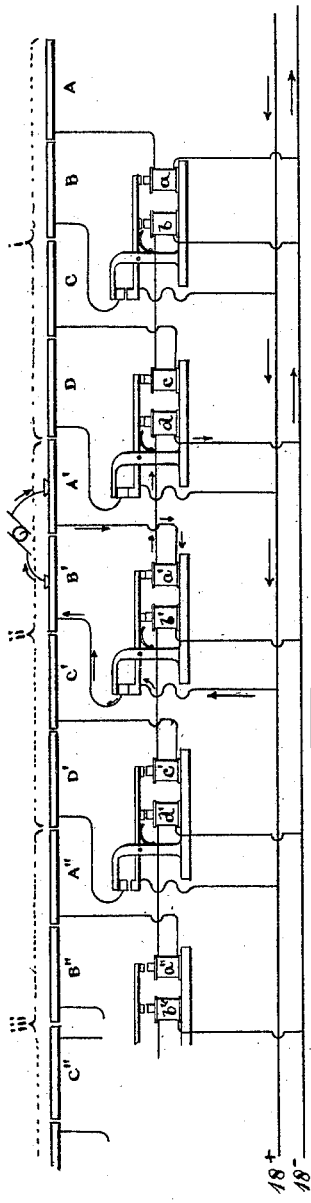
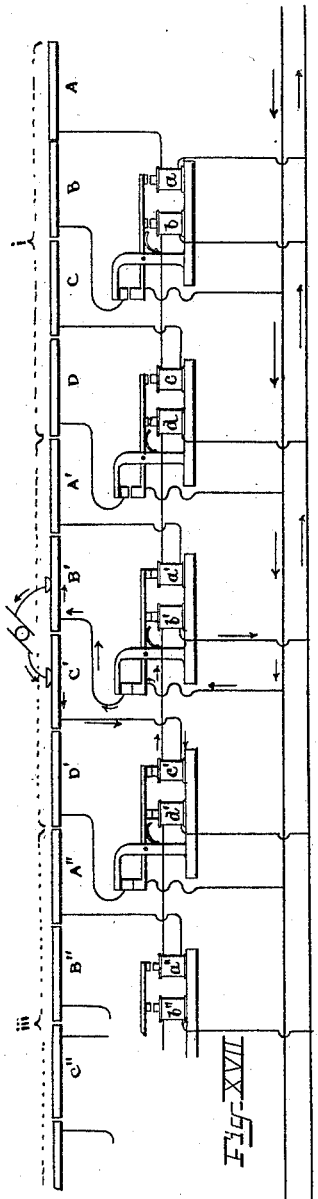
Witnesses.
Frank Guile
Mazie V. Bidgood.
Inventor.
C. W. Thomas
By
Knight Bros
Attorneys.

(No Model.) 13 Sheets—Sheet 7.
C. W. THOMAS.
ELECTRIC RAILWAY.
No. 462,177. Patented Oct. 27, 1891.
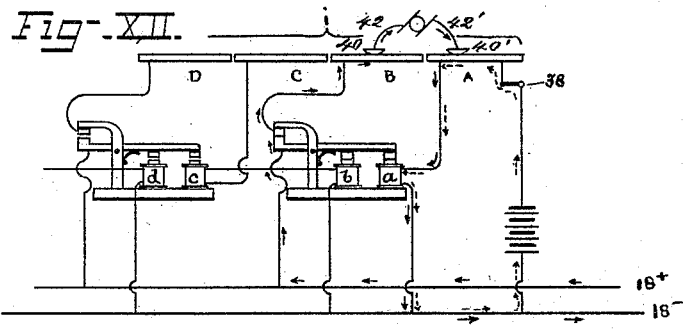
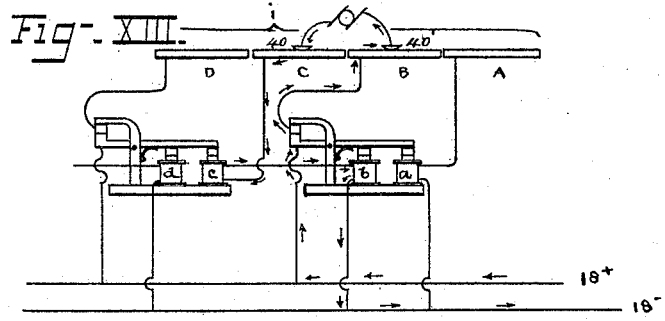
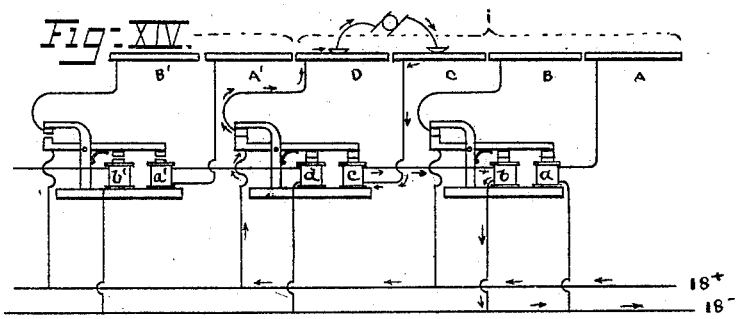
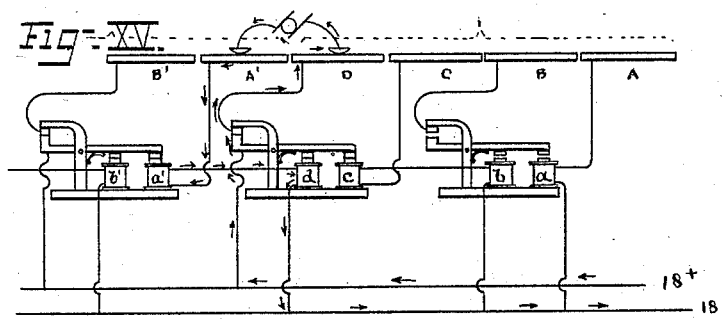
Witnesses
Frank Guile
Mazie V. Bidgood.
Inventor
C. W. Thomas
By Hughes Bros
Attorneys
THE NORRIS PETERS CO., PHOTO-LITHO., WASHINGTON, D. C.

(No Model.)   C. W. THOMAS.   13 Sheets—Sheet 8.
ELECTRIC RAILWAY.
No. 462,177.   Patented Oct. 27, 1891.
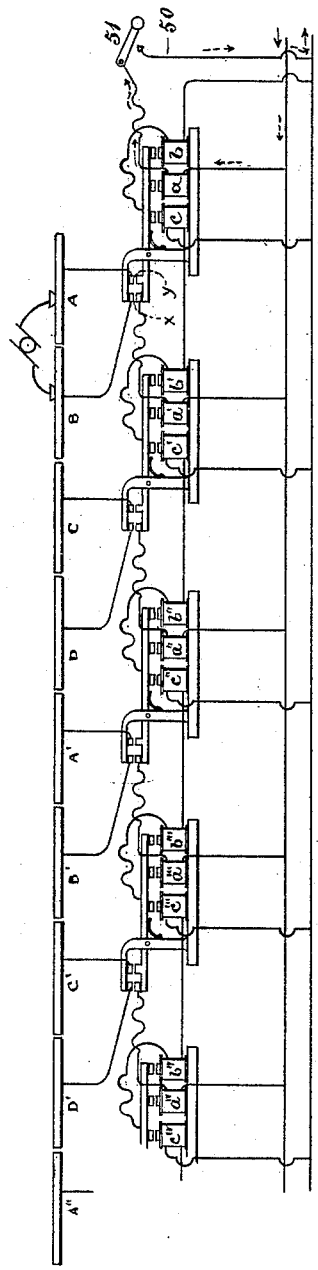
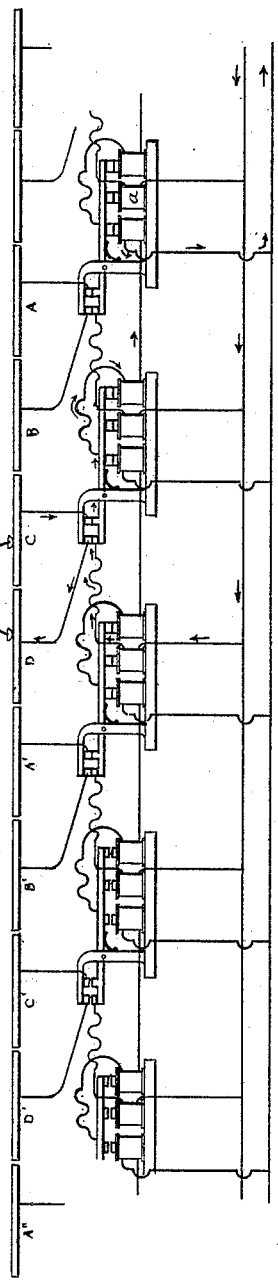
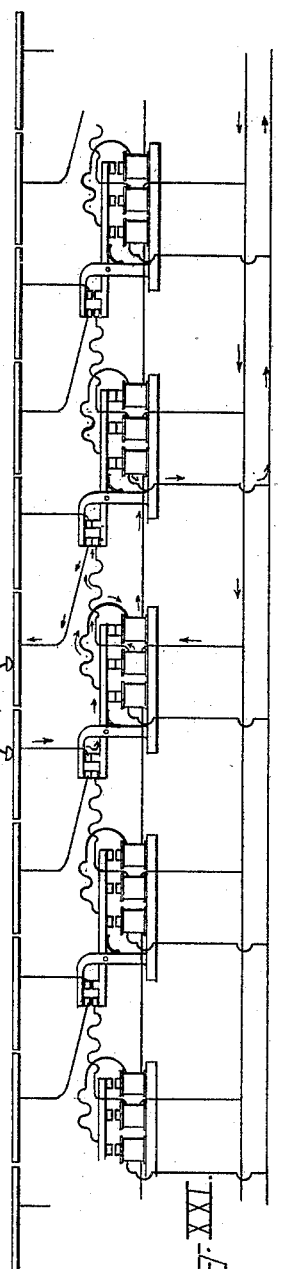
Witnesses
Frank Guile
Mazie V. Bidgood
Inventor
C. W. Thomas
By [signature]
Attorneys (No Model.) 13 Sheets—Sheet 9.
C. W. THOMAS.
ELECTRIC RAILWAY.
No. 462,177. Patented Oct. 27, 1891.
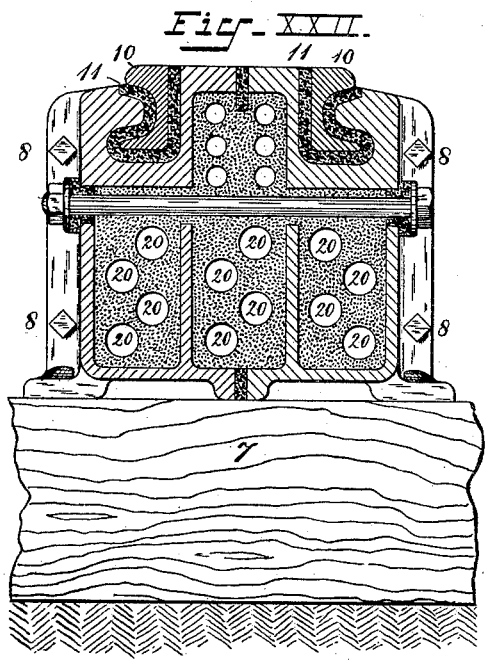
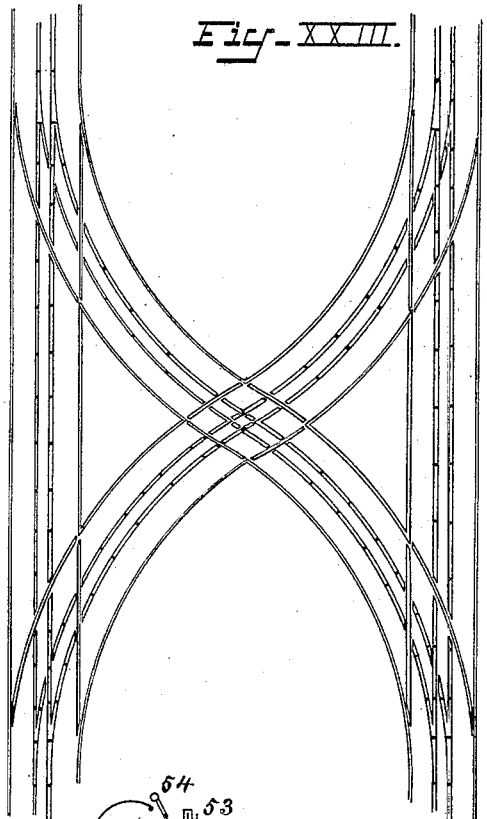
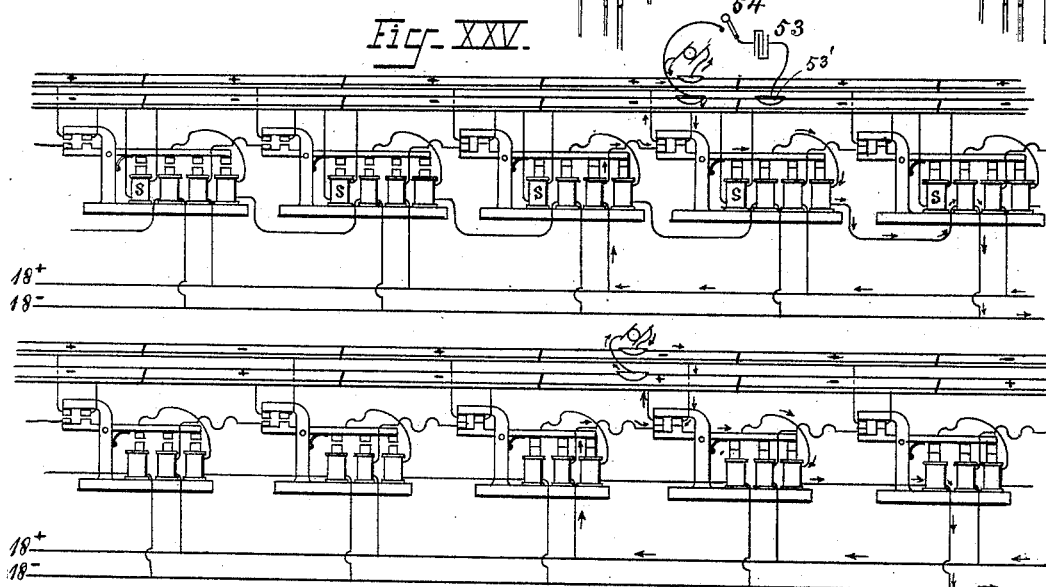
Witnesses
Frank Guile
M. V. Bidgood
Inventor
C. W. Thomas
By Knight Bros
Attorneys (No Model.)
13 Sheets—Sheet 10.
C. W. THOMAS.
ELECTRIC RAILWAY.
No. 462,177.
Patented Oct. 27, 1891.
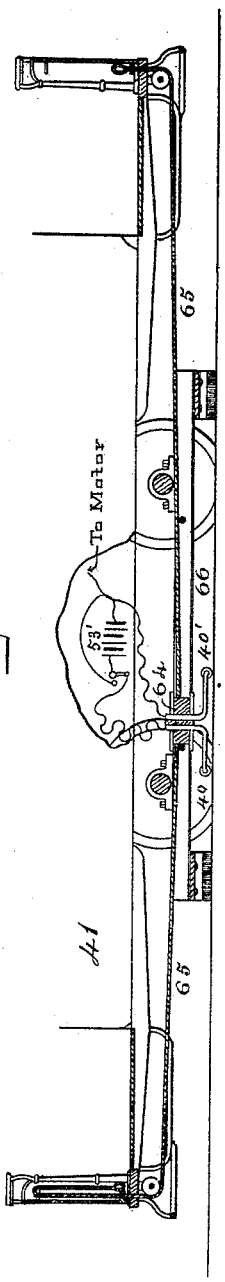
Fig. XXVIII.
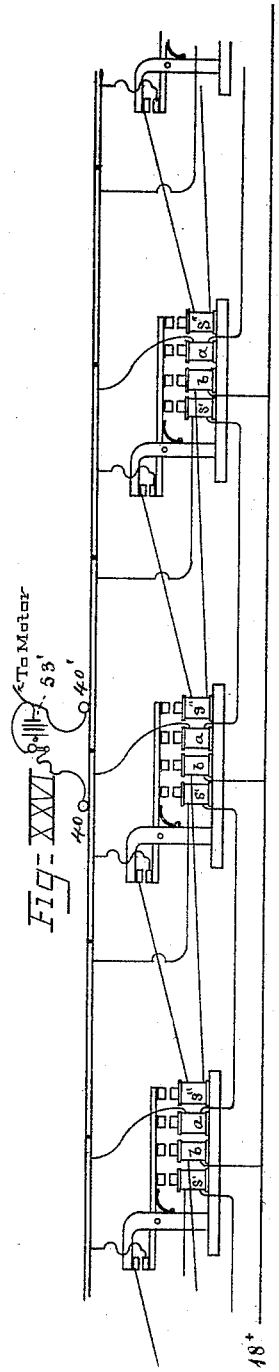
Fig. XXVII.
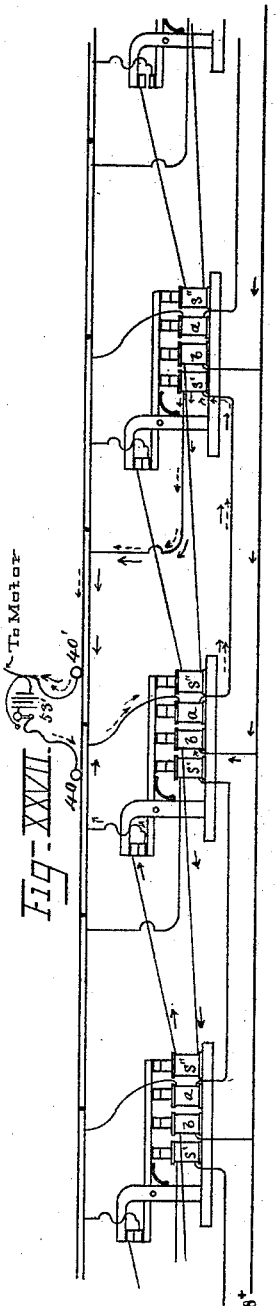
Fig. XXIX.
Witnesses
Frank Guile
Mazie V. Bidgood
Inventor
C. W. Thomas
By Ron Phot Boy
Attorneys (No Model.) 13 Sheets—Sheet 11.
C. W. THOMAS.
ELECTRIC RAILWAY.
No. 462,177. Patented Oct. 27, 1891.
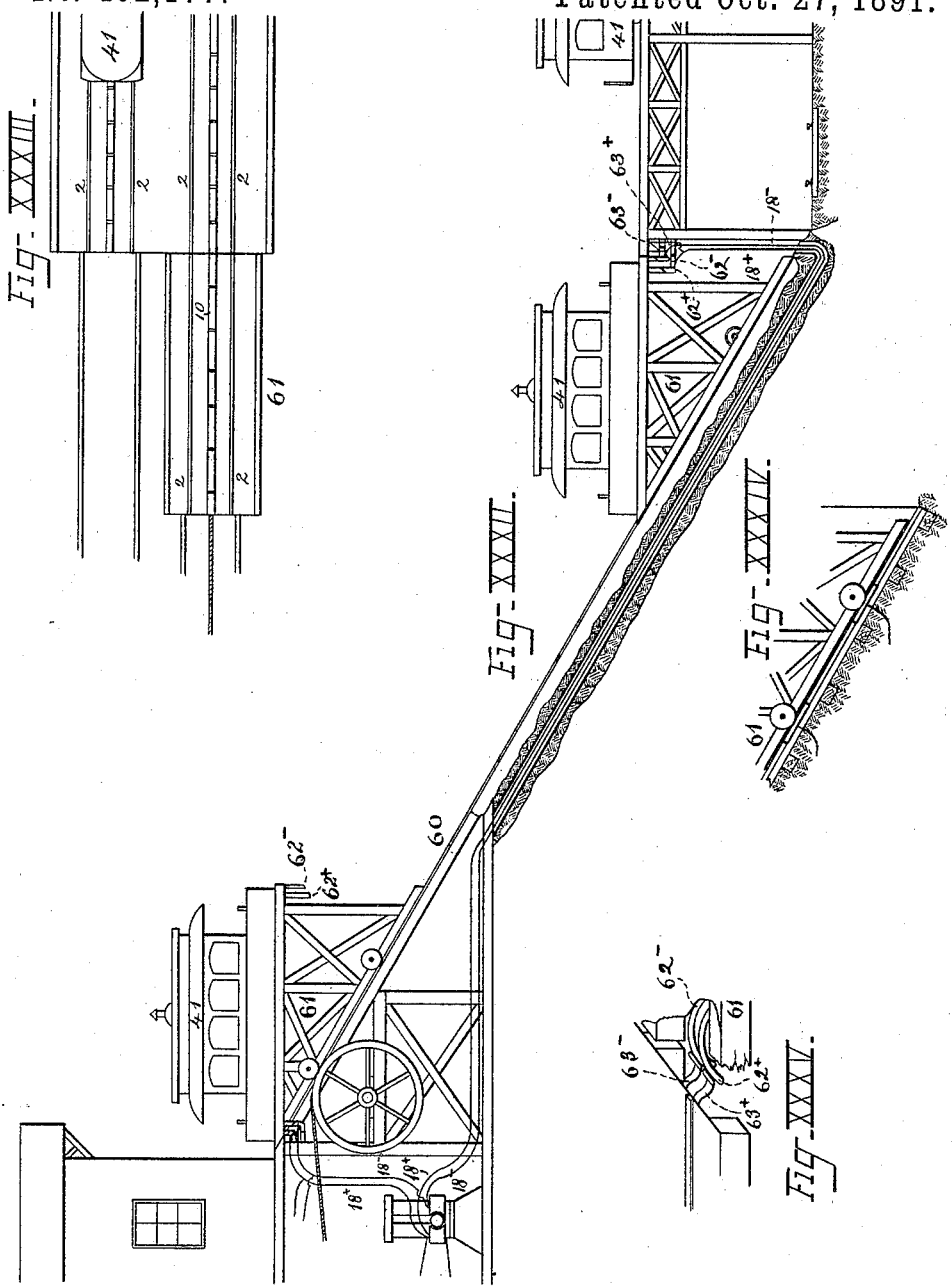
Witnesses
Frank Guile
Mazie V. Bidgood
Inventor
C. W. Thomas
By Knight Bros
Attorneys

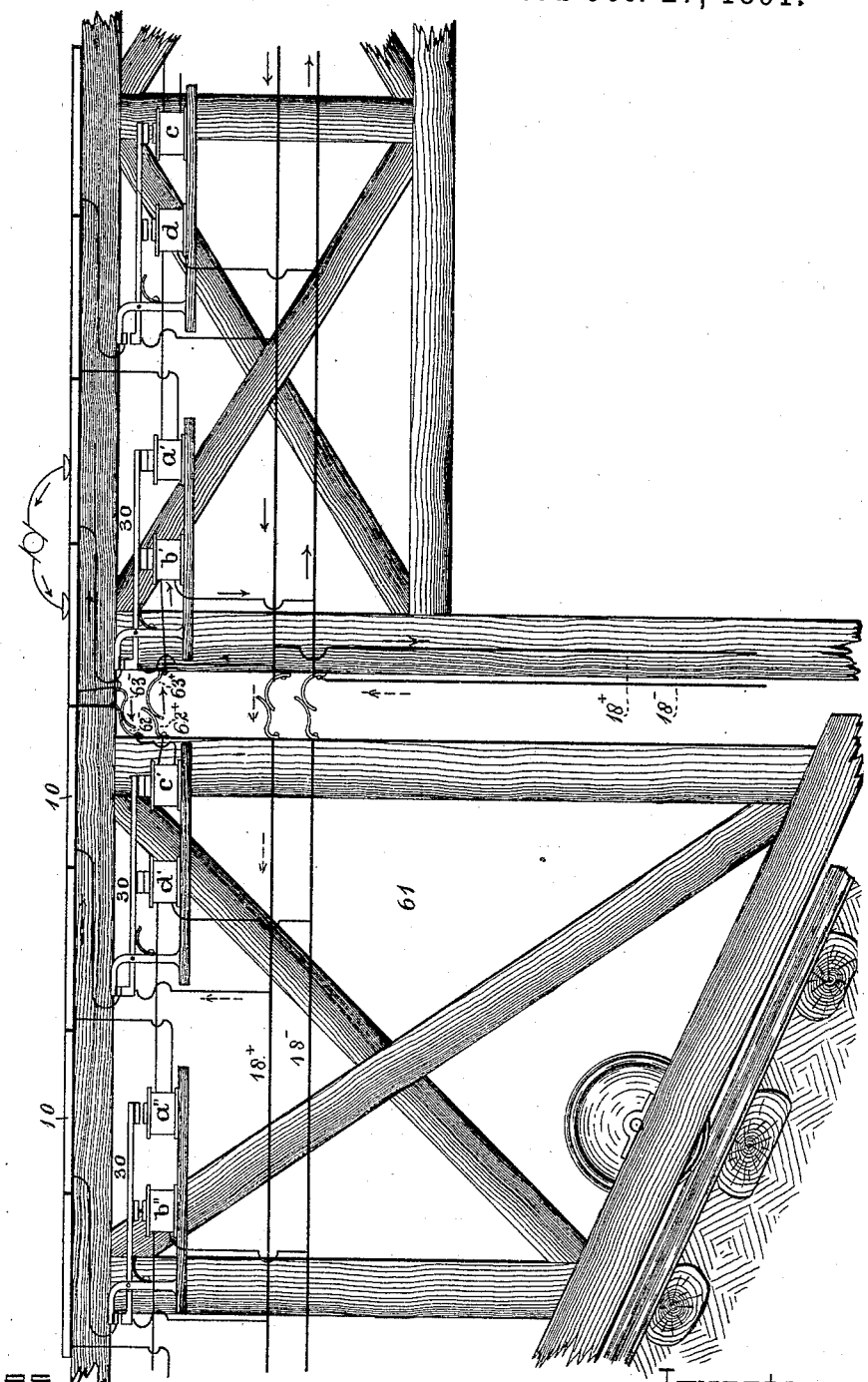

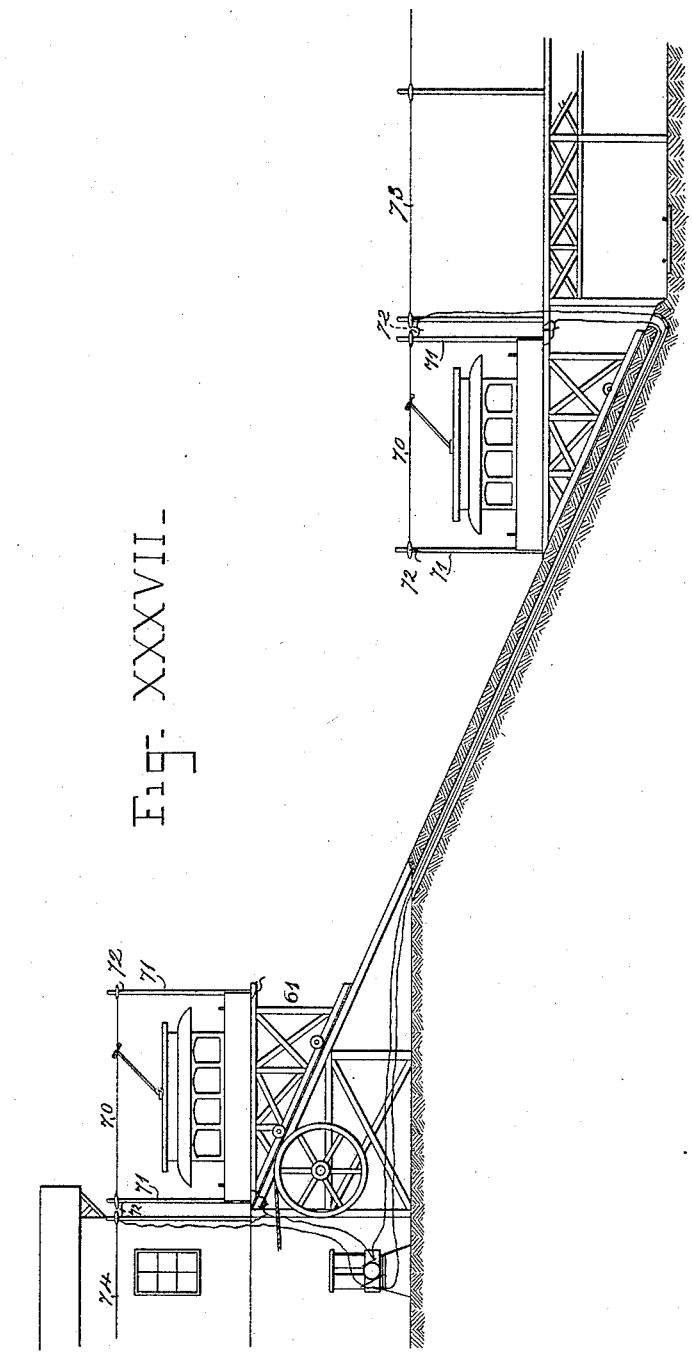
(No Model.)
C. W. THOMAS.
ELECTRIC RAILWAY.
No. 462,177.　　　Patented Oct. 27, 1891.
13 Sheets—Sheet 13.
Fig. XXXVII.
Witnesses
Frank Guile
Mazie V. Bidgood
Inventor
Chas. W. Thomas
per Knight Bros
Attys

United States Patent Office.

CHARLES W. THOMAS, OF NEW YORK, N. Y., ASSIGNOR OF PART TO PHILLIP VAN VOLKENBURGH, OF SAME PLACE, AND JOHN H. PENDLETON, OF BROOKLYN, NEW YORK.

ELECTRIC RAILWAY.

SPECIFICATION forming part of Letters Patent No. 462,177, dated October 27, 1891.

Application filed May 6, 1890. Serial No. 350,838. (No model.)

*To all whom it may concern:*

Be it known that I, CHARLES W. THOMAS, a citizen of the United States, residing in the city, county, and State of New York, have invented a new and useful Improvement in Electrical Railways, of which the following is a specification.

My invention is designed especially for use in those electrical railways which employ complete metallic conductors to and from the current-source as contradistinguished from those in which the current is grounded or returned through the track-rails.

My invention has for its object a utilization of electricity for propulsion of vehicles which combines absolute safety with efficiency and economy. With these objects in view I employ a sealed conduit or tunnel for the outgoing and returning conductors of the dynamo-circuit; a car-motor whose field-windings being in circuit with those of the armature, the latter rotate in one direction notwithstanding the alternating character of the currents; a series of contact plates or bars insulated from each other, but with their upper surfaces exposed and normally insulated from the dynamo-current; car-motor brushes which, by temporarily bridging the consecutive joints between the contact-plates, operate for the instant to include those plates, and consequently to include the car-motor in the dynamo-circuit; and a series of consecutive groups of electro-magnets in the said circuit, which groups operate successively to unite the motor and dynamo circuits through any two consecutive contact-plates which at that particular instant are bridged by the motor-brushes.

The construction and arrangement of my device are such as to be easily accessible at any part for inspection, adjustment, or repair, and to be conveniently associated with means for placing the leads or mains of arc or incandescent lights and other electrical installations.

Referring to the accompanying drawings, which form part of this specification, Figure I is a cross-section of a pair of up and down town street-car tracks applicable to my invention. Fig. II is an enlarged cross-section of one of such tracks. Fig. III is a plan of two such tracks, including a double turn-out. Fig. IV shows one of such tracks in cross-section and a motor-car in end elevation. Fig. V shows a motor-car in side elevation and a portion of conduit in longitudinal section. Fig. VI is a side view of the conduit. Fig. VII is a section of the same on line VII VII, Fig. VIII. Fig. VIII is a section on line VIII VIII, Fig. VII. Fig. IX is a cross-section of conduit, together with the side chamber for my electro-magnets. Fig. X is a longitudinal section on line X X of Fig. IX, showing one pair of my electro-magnets in place. Figs. XI to XVII, inclusive, are diagrammatic elevations representing successive conditions of the series of contact-making electro-magnets, hereinafter explained. Fig. XVIII is a longitudinal section showing one group of a triple arrangement of electro-magnets whereby the current-leakage by grounding or short-circuiting of a wet contact-plate is rendered practically impossible. Figs. XIX to XXI, inclusive, are diagrammatic elevations of the form of circuit-making device represented in Fig. XVIII. Fig. XXII is a cross-section, and XXIII is a plan, of a form of my device in which each track is equipped with two parallel lines of track-plates for use with a motor whose arrangement is such as to bridge laterally from line to line instead of longitudinally on the consecutive plates of one line, as in the previous figures. Figs. XXIV and XXV are diagrammatic elevations of two slightly-different arrangements of electro-magnets for such double line of track-plates, the same employing two parallel lines of contact-plates for utilization of a continuous current. Figs. XXVI and XXVII are diagrammatic elevations of a modification of my device. Fig. XXVIII is a longitudinal section through a car adapted to operate with such a system. Figs. XXIX and XXX represent modifications of my circuit-making electro-magnet. Fig. XXXI shows a modification of my magnet-circuit. Fig. XXXII is a side elevation which is intended to show two such lines at different elevations and connected by an inclined-plane cable elevator. Fig. XXXIII is a plan of the same. Fig. XXXIV shows portions of such incline and such electric track at point of junction. Fig. XXXV shows an arrangement of contact-springs for such. Fig. XXXVI shows a portion of an inclined plane supporting a transfer-truck, which is drawn up the incline by an independent power—such as a cable—and a portion of the contained current-transmitting mechanisms, of identical construction with those of the line proper on the respective levels, and contact-springs for connection therewith at the ends of its journey. Fig. XXXVII represents the adaptation of such inclined-plane connection of two levels of a railway having overhead conductors.

1 may represent a street-pavement, and 2 any suitable track-rails or tramways.

3 may represent a man-hole leading to a pit or vault 4, of which there may be one at each four hundred feet, or thereabout. Each man-hole is sealed by a cover 3'.

5 represents hand-holes having covers 5', of which there may be one for every man-hole.

A series of cast-iron sections 6, spiked down to cross-ties 7 and bolted, as at 8, end to end, constitute the shell or metallic portion of my conduit.

A dovetailed groove 9 at the top of the shell receives a series of contact-plates (track-plates) 10, marked A B C D A' B' C' D', &c., about three feet in length, which are held immovably in place and insulated from the shell and from one another and normally from the dynamo-circuit by gaskets 11, of tar-board, papier-maché, or other suitable substance. Directly under the middle of each contact-plate the groove 9 communicates with a tunnel 12, that extends longitudinally entirely through each section, by orifices 13 for plugs 14 of fibrite or other suitable non-conductor. A bolt 15, being passed vertically through each plug, is screwed fast into the contact-plate immediately above it. Soldered fast to each bolt is a terminal 16 from one of my groups of electro-magnets $a\ b\ c\ d\ a'\ b'\ c'\ d'$, &c. The entire tunnel 12 may be filled with suitable material 17, except where passages are provided for the several kinds of conductors—for example, the dynamo-conductors 18 18, the wires 19, that connect the electro-magnets and the latter with the bolt 15, and, when desired, one or more passages 20 for accommodation of mains or leads for any other electrical installation. The said shell also includes a side chamber or compartment 21 for the series of electro-magnets already referred to. This compartment is provided with a hinged door 5''. The partition-wall 22 between the tunnel 12 and the side chamber 21 has numerous openings 23 for the wires that connect the electro-magnets with one another and with the successive contact-plates 10, which constitute the device by which each car-motor is placed and maintained in electrical communication with the dynamo-circuit.

This device consisting of a series of groups $i\ ii\ iii$, &c., of identical construction and functions, it will suffice to describe one group—say group $i$—as follows: A B C D are precisely similar metallic plates or bars so embedded in the track as to insulate them therefrom and from one another and to present their tops flush, or nearly so, with the track-surface.

24 24 are stands, from each of which rise two iron rods, making four in number—to wit, $25^a$, $25^b$, $25^c$, and $25^d$. A wire 26 from conductor $18^-$ is given one or more turns around rod $25^a$, so as to form a helix $a$ around said rod as a core, whence extending upward, as at 27, it has permanent metallic attachment to plate A, (through bolt 15, already described.) A like wire 28 from conductor $18^-$ forms similar helices $b\ c$ around rods $25^b$ and $25^c$, respectively, and being conducted upward, as at 29, has permanent metallic attachment to plate C. Fulcrumed to each stand 24 is a keeper 30, whose insulated armatures $31^a$ and $31^b$ are held normally aloof from the helix-cores $25^a\ 25^b\ 25^c\ 25^d$ by a spring 32, which by the same act holds contact-piece 33 of said keeper aloof from insulated contact-piece 34 on stand 24. Each contact-piece 33 communicates by wire 35 with conductor $18^+$, and the contact-pieces 34 respectively communicate through the appropriate bolts 15 with the respective plates B and D.

36 represents any convenient auxiliary source of current, such as a relay or a storage-battery, which, being connected by wire 37 with conductor $18^-$, is capable of being put in communication with plate A by means of a switch 38. This switch is employed only at the terminal of the road.

40 40' represent the brushes of the motor-circuit of an electric car 41. Springs 42 maintain contact of these brushes with the exposed surfaces of the plates A B, &c.

The purpose of diagram Fig. XI is to illustrate the normal or inoperative condition of the road. In this condition all the keepers stand aloof from their magnets and no current passes through either the general (dynamo) circuit $18^+\ 18^-$ or through the motor-circuit.

Diagram Fig. XII shows the device after current has been initiated by closure of the switch 38, the dotted arrows indicating the path of the initiating-current and the strong arrows that of the current which now circulates through the mutually-completed dynamo and motor circuits.

Figs. XII to XVII, inclusive, show the conditions of the parts and indicate the current-paths at the successive advances of the car, which cause the consecutive bridging of plates A to B, B to C, C to D, D to A', A' to B', and B' to C'. It will be seen that each bridge-shift reverses the direction of current in the motor; but inasmuch as in the kind of motor used both field and armature share in any current reversal such change does not affect the armature action.

To enable the person in charge to restore to contact a keeper which fails to respond to the magnetic force at the proper juncture, I provide a prod 45, (see Figs. IX, X, and XVIII,) which is normally upheld by a spring, preferably a concentrically-corrugated brass disk 46. Releasing the cover 47 by means of latch 48 gives the operator access to said prod and enables him by its momentary depression to press the keeper into the position of contact and restore the circuit.

In the form illustrated in Figs. XVIII to XXI, inclusive, the electro-magnets are arranged in groups of three, and completion of the combined motor and dynamo circuits is made to depend on the impact of two pairs of contacts $x$ $y$. Hence when the keeper is open communication of the motor and track-plates is broken both with the outgoing and returning conductors of the dynamo-circuit and short-circuiting is rendered impossible. Action in this form is initiated by a local loop 50, whose momentary closure by means of switch 51 produces a current, such as indicated by dotted arrows in Fig. XIX, of sufficient duration to close the keeper and both plus and minus contacts $x$ and $y$. The switch 51 being then reopened, current passes through the motor and through the several electro-magnets, as indicated by strong arrows in Figs. XIX, XX, and XXI.

In the arrangement represented in Fig. XXIV such double line of track-plates is made available for a form in which the electro-magnets are in groups of three each, and is such that the current enters the motor at each consecutive pair of plates by a different track-line, so as to reverse the motor-current at each three feet advance of the car along the track. This alternation of current-direction is indicated by the signs $+ - - +$ on the consecutive track-plates. This form is particularly designed for steep gradients requiring great electrical power to propel the vehicle.

In the arrangement represented in Fig. XXV such a double line of track-plates is made available for a form which employs a supplementary electro-magnet S, which co-acts with a storage-battery 53, having a contact-terminal 53′ upon the car to initiate current and start the car. In this form the currents enter the motor exclusively through one line of track-plates and return wholly through the other. In the figure the apparatus is represented in the condition it reaches after initiation of current by the storage-battery and the consequent starting forward of the car upon which the switch 54 has been reopened, so as to cut the supplementary magnets S out of circuit.

In the form of my device represented in Figs. XXVI, XXVII, and XXVIII the dynamo-current is supplied by a single conductor $18^+$ and is led to and from the track-plates through the electro-magnet system and escapes through the motor to ground. This form employs a local starting-battery 53′ and one pair of keeper-contacts and two electro-magnets S′ S″ in addition to those shown in Figs. XI to XVII, inclusive. Current is initiated (see broken arrows) by the said battery, which, closing the keeper, throws a working current (see strong arrows) through and overpowering the battery and through the motor to ground.

Fig. XXVI shows the line quiescent, and Fig. XXVII active. Fig. XXVIII shows the motor-trolleys attached to a runner 64, which can by cord 65 be slid forward or backward on a track 66, so as to shift the trolleys to a position that will bridge the desired pair of track-plates for starting.

Figs. XXIX and XXX represent two expedients for reducing such electro-magnet groups to more compact form by arrangement of the several helices about a single core, which may be either in different planes, as in Fig. XXIX, or concentrically one within another, as in Fig. XXX.

Fig. XXXI shows a form of the electro-magnet connections in which shunts 55 56 are provided for the purpose of reducing resistance by shunting a portion of the motor-current around the magnets to close the keeper.

For situations where the relative levels of two parts of a track are such as to require an inclined-plane cable elevator 60, I provide a transfer or transporting truck 61, whose form and dimensions are such as to place its platform or upper surface and the track-rails thereupon in alignment with the corresponding parts of the lower and upper levels, respectively, the lower part of the said truck conforming to the slope of the incline, as shown in Fig. XXXII. Said platform is provided with a line of insulated track-plates, as shown in Fig. XXXIII. Customarily about twelve of such plates in line will be required on one truck-platform. Such truck will likewise be equipped with two conductors $62^+$ $62^-$, which at each end of the incline, make contact with spring-terminals $63^+$ $63^-$ of the dynamo-circuit $18^+$ $18^-$. Associated with and connected to the said track-plates and the rods $62^+$ $62^-$ are groups of electro-magnets with their accessories, which, being precisely like those already described for the track proper, need not be shown. In consequence of this equipment of track-plates and electro-magnets the motor action of a car entering on the truck-platform from either level will be maintained until, the car having reached the middle of the platform, the person in charge cuts the motor out of circuit and stops the car. Start of the truck up or down the incline cuts it out of circuit and the contact-making system becomes dead, so that the car simply remains quiescent upon the platform. Restoration of contact at the other end of the incline, renewing the activity of the contact-making devices, brings the motor again into service and runs the car off the platform onto the track proper, and the journey is resumed.

The described arrangement and operation always secures one excited magnet in advance and another immediately in rear of those concerned in transmitting the motor-current, so that in running ahead or in backing the newly-utilized track-plate is ready to transmit a working current the instant the motor-terminal touches it.

It will be seen that accident is in the above-described system impossible, because the dynamo-currents cannot possibly reach the surface by contact with one or more track-plates of any person or animal and because no more than four consecutive plates located wholly under the middle portion of the car are at any one time and place brought into activity—that is to say, the twelve feet of live plate are protected from and made inaccessible to the public by twenty-seven feet length of car. The arrangement permits the electro-magnets $a\ b\ c\ d$, &c., to be placed at any desired distance below or to one side of and far removed from magnetic proximity to the track-plates and unaffected by any subsidence or derangement of the said plates or the road-bed. The arrangement may be such that a person standing in the pit 4 can watch the magnets and satisfy himself of their operation as a car passes over.

Fig. XXXVII shows my system of inclined-plane connection adapted to connect two different levels of an electric railway which has an aerial or overhead conductor. In this figure 70 represents a conductor supported at suitable height on posts 71, that project from and travel with the transfer-truck 61. Contact-springs 72 (when the truck is at either end of its journey) make electrical connection with the wires 73 or 74, respectively, of the line proper. As in the form represented in Fig. XXXVI, departure of the truck 61 on its upward or downward flight severs the electrical connection, and the car remains quiescent on the truck until re-establishment of current at the other terminus operates to restart the car-motor and to run the car off the truck onto the main line.

Having thus described my invention, the following is what I claim as new therein, and desire to secure by Letters Patent—

1. In an electric railway, the described combination of a series of insulated contact-plates in or parallel with the track, a car-motor circuit whose brushes have sliding contact with and bridge the consecutive plates, a dynamo-rheophore which connects through a pair of electro-magnets with every alternate plate and keepers, of which each consecutive two operate by their closure, the one to complete the motor-dynamo circuit through one of the intermediate plates and the other to enable such completion through the next in advance intermediate plate, substantially as set forth.

2. In an electric railway, the described combination, with insulated rheophores, of a normally-open dynamo-circuit, a series of insulated truck-plates A B C D A' B' C' D', &c., car-motor brushes 40 40', adapted to traverse and bridge the consecutive track-plates, contact-pieces 34, of which one connects with each alternate track-plate B D B' D' B'' D'', wires 28 29, of which one connects each of the other or intermediate track-plates A C A' C' A'' C'' with the negative rheophore 18 and contains a pair of electro-magnetic helices $b\ c\ d\ a'\ b'\ c'\ d'\ a''$, normally-retracted keepers 30, having contact-pieces 34 and having armatures 31, whose attraction by said magnets, by closing said contact-pieces 33 34, operates to intermittently complete the motor-dynamo circuit and to propel the car.

3. In an electric railway, the described combination, with a closed conduit for the dynamo-rheophores, of a series of insulated track-plates, a car-motor whose circuit-terminals have permanent sliding contact with and bridge the consecutive plates, a dynamo-rheophore which connects through a pair of electro-magnets with every alternate plate, and a series of keepers, of which each consecutive two operate by their temporary closure, the one to complete for the instant the motor-dynamo circuit through one of the intermediate track-plates and the other to enable such completion through the next intermediate track-plate in the direction of travel, as and for the purpose set forth.

4. The combination, in an electric railway, of a series of track contact-plates 10 of a motor-circuit whose brushes 40 40' bridge or straddle the consecutive plates and slide thereupon, and contained within a sealed subway or conduit 6 the following devices, to wit: an insulated normally-open dynamo-circuit 18+ 18−, electro-magnets $a\ b\ c\ d$, &c., in said circuit, keepers 30 to said magnets bearing normally-separated contact-pieces 34, a local-current starter 36 in the dynamo-circuit, and a switch 38 for making and breaking said starter-circuit, substantially as set forth.

5. The combination, with a railway-track or tramway, of an insulated normally-open dynamo-circuit in a tube, sealed conduit or subway, a series of insulated track-plates 10, parallel to and flush, or nearly flush, with the track and exposed on top, car-motor circuit whose brushes 40 40' are adapted to slide along said plate-series and to bridge the consecutive plates, keepers 30, bearing normally-detached contact-pieces 34, of which one connects with each alternate track-plate, wires 28 29, having helices $b\ c$, &c., in said dynamo-circuit, and which connect said circuit with the several intermediate track-plates, and a local source 36 of current for starting the car, substantially as set forth.

6. In an electric railway, the described combination, with insulated rheophores of a normally-open dynamo-circuit and with a sealed conduit containing said rheophores, of the following elements, to wit: a series of insulated track-plates A B C D A' B' C' D', &c., exposed on their upper surfaces, car-motor brushes 40 40', adapted to slide along and bridge the consecutive track-plates, contact-pieces 34 of which one connects with each alternate track-plate B D B' D' B'' D'', wires 28 29, of which one connects each of the other intermediate track-plates A C A' C' A'' C'' with the negative rheophore 18 and at parts of its length takes the form of two electro-magnetic helices $b\ c\ d\ a'\ b'\ c'\ d'\ a''$, contact-pieces 33, normally insulated from the contact-pieces 34 and connected to the positive rheophore 18, said contact-pieces being mounted on normally-retracted keepers 30, having armatures 31, to said electro-magnets, whose attraction by said magnets operates, by momentarily closing said contact-pieces, to complete the motor-dynamo circuit and propel the motor in the manner explained.

7. In an electric railway, the described combination of T-formed track-plates 10 with the conduit-shell 6, having the dovetail groove 9, the gasket 11, the insulating-plug 14, and the attaching and conducting bolt 15.

8. In an electric railway, the combination, with the insulated track-plates 10 and the conducting and attaching bolt 15, of the conduit-shell 6, having the tunnel 17 for the conducting-wires, said tunnel having lateral communication 23 with compartment or receptacle 21 for the circuit-making apparatus $a\ b$, &c., accessible, but normally sealed by covers 5.

9. In an electric railway, the combination, with keepers 30, of prod 45, retractile spring 4, and the locked cap or cover 47, for the purpose designated.

10. In an electric railway, the combination and arrangement of the circuit-making electro-magnets, in groups of three, with keepers, of which each has three armatures and a pair of positive and a pair of negative contacts $x\ y$, for the purpose set forth.

11. In an electric railway, the combination, with the triple electro-magnets and magnet-armatures and the positive and negative pairs of contacts on each keeper, of the two lines of alternately positive-negative and negative-positive track-plates, and the motor-brushes adapted to bridge from line to line laterally, as set forth, and for the purpose explained.

12. In an electric railway, the combination, with two parallel lines of track-plates, of which those in one line are all positive and those in the other line are all negative, and with a pair of laterally-straddling motor-brushes, a local battery 53, having contact-brushes 53', and a switch 54, of the supplementary electro-magnets S, for the purpose herein made known.

13. In an electric railway, the combination, with a normally-open dynamo-circuit, insulated track-plates, a car-battery 53', brushes 40 40' common to the motor-circuit and said battery, and a keeper bearing a single normally-separated contact-piece and four normally-separated armatures, of the two principal electro-magnets $a\ b$, and the two supplementary electro-magnets S' S'', for the purpose explained.

14. In an electric railway, the means for shifting the motor-terminals forward or backward on the line of track-plates, consisting of the runner 64, track 66, and cord 65.

15. In an electric railway, the combination, with two tracks at different levels, of an inclined plane supporting an independently-propelled truck supporting tracks and conductors which correspond to those of said levels, and means whereby said truck-conductors are alternately connected with and disconnected from the line-wires of the respective levels, substantially as set forth.

16. In an electric railway, the combination, with two lines of track-plates at different levels and with an inclined plane, of truck 61, equipped with a line of current-transmitting track-plates, which correspond to those on the track proper, and with elastic contacts $62^+$ $62^-$, which at each extremity of the incline make electrical communication with contact-pieces $63^+$ $63^-$ of the dynamo-circuit, as set forth.

17. In an electric railway, the conduit 6 for electric wires, sealed or covered above and provided with hand-holes 5 below, which communicate with pits 4, approachable through covered man-holes 3, substantially as set forth.

CHARLES W. THOMAS.

Witnesses:
 GEO. H. KNIGHT,
 WM. H. BLAIN.